Jan. 1, 1952     E. O. WOODS     2,580,495
COMBINATION RELEASABLE LOCKING DEVICE
Filed Jan. 20, 1947

INVENTOR.
ELMER O. WOODS
BY
HIS ATTORNEYS

Patented Jan. 1, 1952

UNITED STATES PATENT OFFICE 2,580,495

COMBINATION RELEASABLE LOCKING DEVICE

Elmer O. Woods, Los Angeles, Calif.

Application January 20, 1947, Serial No. 722,993

1 Claim. (Cl. 24—230)

(Granted under the act of March 3, 1883, as amended April 30, 1928; 370 O. G. 757)

The invention described herein may be manufactured and used by or for the Government for governmental purposes without payment to me of any royalty thereon.

This invention relates to improvements in anchoring devices for temporarily but securely attaching miscellaneous equipment to a structure, and more specifically for attaching radio equipment to an aircraft structure.

It was necessary, prior to this invention, to secure conventional slide fasteners of the type herein described, with safety wire, to prevent disengagement. The use of safety wire to secure slide fasteners is a long and tedious operation, and especialy so if the equipment to be secured is not accessibly located.

An object of this invention is to expedite the maintenance of equipment that is temporarily attached to a structure, and that must be removed from the basic structure for repair and maintenance.

Another object of the invention is to provide a readily disengageable locking means for securing conventional slide fasteners.

Another object is to provide locking means which will not interfere with the ready use of such slide fasteners.

Another object is to provide a locking means which will engage automatically to hold the fastener when the slide fastener is engaged with the anchoring post.

Other objects and advantages will appear from the following description.

Figure 4:
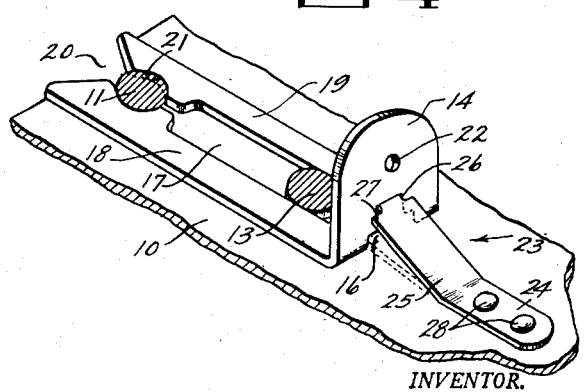
Fig. 4 is a perspective view taken from a position midway between that occupied when viewing the assembly in Figs. 2 and 3.

In Figs. 1, 2 and 3, 10 is a plate, preferably of metal, which it is desired to attach to a post 11 which may be mounted on a different structure. Plate 10 may be the metal flange on a radio receiver while post 11 may be attached to the instrument board of an airplane or the like. Mounted upon the plate 10 there is a snap slide 12 which is slidable past a rivet 13. The snap slide 12 has an upturned end 14, the lower portion of which bears an opening 16 which is a continuation of a slot 17. As is well known, the slide 12 is divided into two portions 18 and 19 (Fig. 4) by the slot 17. These portions are spring tempered and are temporarily forced apart when the open end 20 engages a special slotted post 11, the slot of which is of a diameter slightly larger than a round opening 21 (Fig. 4) into which it is admitted and therein held by the spring of portions 18 and 19.

Despite the excellent grip on the post 11 exerted by the snap slide 12, it has been found insufficient to hold apparatus securely on airplanes. In order to hold the snap slide 12 onto post 11, it has been customary to run a wire through a hole 22 in the end of the slide and also run the wire through a hole 29 in the post 11. The ends of the wire were then twisted. It is the purpose of my invention to avoid this cumbersome fastening of wire.

Figure 1:
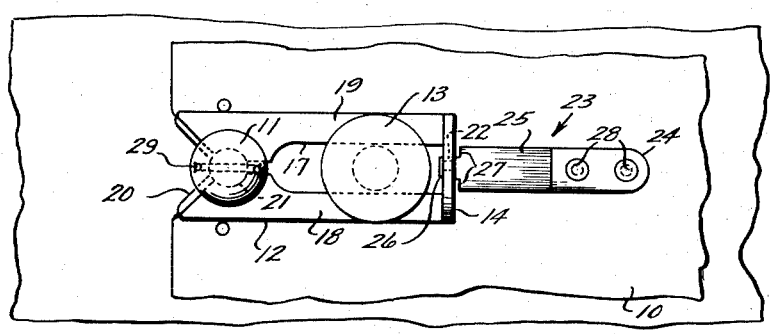
Fig. 1 is a plan view of a slide fastener and the securing device in locked position.
Figure 2:
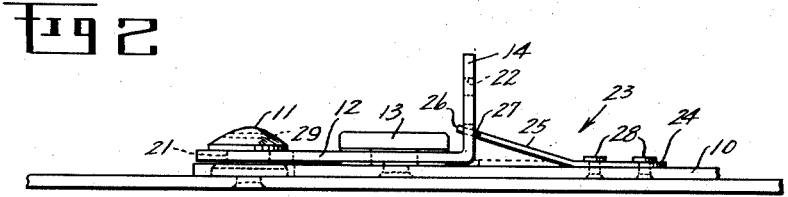
Fig. 2 is a side elevation corresponding to Fig. 1.
Figure 3:
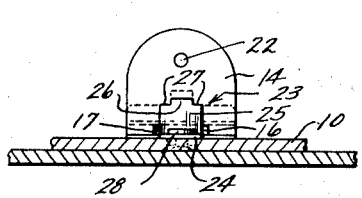
Fig. 3 is an end view taken from the right hand end of Fig. 2.

The securing device comprises a leaf spring 23 which has a flat portion 24 and an angled portion 25. At the higher extremity of portion 25, there is a tongue 26 and a pair of shoulders 27 (Fig. 1). The tongue 26 is proportioned to fit into the opening 16. The shoulders are adapted to bear against the upturned slide end 14. In this position of the securing device, the snap slide cannot be withdrawn from post 11 because the leaf spring is held in position by rivets 28 which extend through both the plate 10 and the flat portion 24 of the leaf spring 23.

When it is desired to retract the snap slide 12, the leaf spring 23 is pressed down with the thumb nail while the index finger and thumb of the same hand retract the snap slide. Since the opening 16 is wider at its base than at its top, shoulders 27 can enter the slot 17. Leaf spring 23 therefor is made sufficiently narrow so that it may enter slot 17 with ample clearance, yet wide enough so that shoulders 27 can abut slide end 14 while tongue 26 is in opening 16.

When slide 12 is slid forward to engage post 11, inclined portion 25 of leaf spring 23 begins to slide along the top of opening 16 as the slide nears the post. As engagement with the post 11 takes place, the tongue 26 also engages the top of opening 16 and the shoulders 27 engage portion 14 of the slide due to the spring action of part 25 of the leaf spring 23. Automatic locking of the slide therefore takes place at the post 11 and at the shoulders 27 simultaneously. The only manual operation necessary is to push the slide by its portion 14 into engagement.

The invention claimed is:

In a combination comprising a slide fastener and releasable securing devices therefor, a base plate, a slide fastener of a snap-slide leaf type having a pair of side-by-side leaves mounted on said base plate, a slotted post arising over said base plate at the forward end thereof, said post being releasably engageable by the outer ends of said leaves, rivet-like retaining means extending upward from said base plate rearwardly of said post for holding the leaves of said snap slide fastener in slidable engagement therewith and in alignment with said post, an upturned rear end on said snap slide fastener, said leaves being joined together only at the upturned portion thereof, said rear end having an opening adjacent the region where the end is upturned, said opening being of greater width at its bottom than at its top, a leaf-type spring attached to said base plate by one of its ends, said spring having a gently rising portion, an integral tongue and shouldered end substantially on the same plane with each other and with said spring, said end normally abutting with its shoulders the edges of the opening in the upturned portion of the snap slide fastener, the tongue extending therein to secure the snap slide fastener in locked position, the shoulders and the leaf spring being adapted to pass through the lower part of the opening in the upturned portion of the snap slide fastener when the inclined portion of the leaf spring is depressed whereby to allow manual retraction of the snap slide upturned portion over the leaf spring, the latter being releasable between the leaves of the snap slide fastener and being positioned wholly behind the rivet-like retaining means even when the inclined portion is depressed, whereby to clear said retaining means at all times.

ELMER O. WOODS.

REFERENCES CITED

The following references are of record in the file of this patent:

UNITED STATES PATENTS

| Number | Name | Date |
|---|---|---|
| 266,600 | Blayney | Oct. 31, 1882 |
| 291,519 | Jones | Jan. 8, 1884 |
| 405,962 | Kennedy | June 25, 1889 |
| 1,968,557 | Johanson | July 31, 1934 |
| 2,081,606 | Sorkind | May 25, 1937 |
| 2,164,657 | Levy | July 4, 1939 |
| 2,326,558 | Pelz | Aug. 10, 1943 |

FOREIGN PATENTS

| Number | Country | Date |
|---|---|---|
| 441,173 | Great Britain | Jan. 14, 1936 |